United States Patent [19]

Rappas et al.

[11] Patent Number: 4,891,067
[45] Date of Patent: Jan. 2, 1990

[54] PROCESSES FOR THE TREATMENT OF SMELTER FLUE DUST

[75] Inventors: Alkis S. Rappas, Chagrin Falls; Brett T. Waterman, Bedford, both of Ohio

[73] Assignee: Kennecott Utah Copper Corporation, Wilmington, Del.

[21] Appl. No.: 193,873

[22] Filed: May 13, 1988

[51] Int. Cl.$^4$ .............................................. C01G 21/02
[52] U.S. Cl. ...................... 75/101 R; 75/25; 75/108; 75/120; 75/121; 75/117; 423/87; 423/92; 423/98; 423/35; 423/55; 423/551; 423/602; 204/96; 204/116
[58] Field of Search .................. 423/87, 92, 88, 54, 423/35, 602, 554, 55; 75/101 R, 25, 117, 12, 108, 120; 204/96, 116

[56] References Cited

U.S. PATENT DOCUMENTS

| | | | |
|---|---|---|---|
| 592,055 | 10/1897 | Ketchum | 204/116 |
| 1,243,323 | 10/1917 | Macklind et al. | 423/87 |
| 1,504,627 | 8/1924 | Lamb | 423/87 |
| 1,509,688 | 9/1924 | Parsons et al. | 423/87 |
| 1,827,821 | 10/1931 | Kirsebom | 75/25 |
| 2,951,741 | 9/1960 | Sill | 23/53 |
| 3,248,212 | 4/1966 | Mellgren et al. | 75/101 R |
| 3,463,707 | 8/1969 | Gibson, Jr. et al. | 204/96 |
| 3,966,461 | 6/1976 | Miller et al. | 75/101 R |
| 4,026,988 | 5/1977 | Wells et al. | 423/87 |
| 4,046,687 | 9/1977 | Schulze | 210/32 |
| 4,244,734 | 1/1981 | Reynolds et al. | 75/101 R |
| 4,244,735 | 1/1981 | Reynolds et al. | 423/87 |
| 4,244,927 | 1/1981 | Reynolds et al. | 423/87 |

FOREIGN PATENT DOCUMENTS

| | | | |
|---|---|---|---|
| 3043021 | 6/1982 | Fed. Rep. of Germany | 204/116 |
| 2510141 | 1/1983 | France | 423/104 |
| 55-130822 | 10/1980 | Japan | 423/54 |
| 136853 | 8/1979 | U.S.S.R. | 75/120 |
| 952977 | 8/1982 | U.S.S.R. | 75/101 R |
| 1118702 | 10/1984 | U.S.S.R. | 75/101 R |

OTHER PUBLICATIONS

Shul'gin et al., "Extraction of Arsenic from Lead Converter Dust", Industrial Inorganic Chemicals, vol. 67, 1967, 118640v.

B. R. Kretschmer and A. M. H. Wauchope, "Recovery of Arsenic from Lead Refinery Residues", The Aus. I.M.M. Melbourne Branch, Symposium on "Extractive Metallurgy", Nov. 1984.

A. A. Rozlovskii and V. A. Bogdanov, "Processing Arsenical By-Products at Non-Ferrous Metallurgy Enterprises", Soviet Journal of Non-Ferrous Metals, Feb. 1976.

Primary Examiner—Robert L. Stoll
Attorney, Agent, or Firm—Fleit, Jacobson, Cohn, Price, Holman & Stern

[57] ABSTRACT

A process for the treatment of flue dust from copper and lead smelters includes the steps of subjecting a slurry (10) of water and flue dust to a first caustic leach (12) to form a first liquids soluble sulfate solution (14) and a first solids portion (15), subjecting the solids portion to a second caustic leach (16) to solubilize lead and arsenic in a second liquid portion (22) and, selectively extracting the arsenic from the second liquid portion by precipitation (23). A related process for the treatment of flue dust allows for the recovery of bismuth and includes the steps of separating (53) a slurry of water and flue dust into a first liquids (54) and first solids (63) portion, neutralizing (55) the first liquids portion to form a second liquids soluble sulfate solution (58) and a second solids portion (59), subjecting the first solids (63) portion to a first caustic leach (61) to produce a third liquids (66) and third solids portion (82), subjecting the third liquids portion (66) and the second solids portion (59) to a second caustic leach (60) to produce a fourth liquids (68) and fourth solids portion (91) and, selectively extracting arsenic from the fourth liquids portion (68) and bismuth from the third solids portion (82). A process for the recovery of soluble lead values from lead compounds includes the steps of subjecting a slurry (100) of the lead compound to a caustic leach (101) to solubilize the lead and oxidizing the lead in an electrolytic cell (38) to form lead oxide.

39 Claims, 4 Drawing Sheets

PROCESSES FOR THE TREATMENT OF SMELTER FLUE DUST

TECHNICAL FIELD

The present invention relates to the treatment of flue dust from lead and copper smelting operations. Flue dust contains a variety of elements as impurities including arsenic. In the United States there are tens of thousands of tons of flue dust in storage from smelting operations and the stockpile continues to grow each year. Current and anticipated EPA classifications of this material as hazardous waste dictate that it be disposed of safely.

Flue dust also contains bismuth, a metal that the U.S. must import to meet its needs. Although bismuth can be extracted from flue dust, the yields are poor unless the arsenic content has first been significantly reduced. The processes of the present invention provide treatments for flue dust to recover arsenic, copper and other elements as well as bismuth, if desired, which are relatively inexpensive because they do not require pressure and heat for their operation.

BACKGROUND ART

A variety of methods and processes are described in the patent literature for the treatment and recovery of arsenic from ores and dusts. Many of these apply a caustic or alkali extraction.

U.S. Pat. No. 1,243,323 discloses the reaction of smelter dusts with calcium hydroxide for recovery of arsenic containing compounds that are useful as insecticides.

U.S. Pat. No. 1,504,627 is directed toward a process for the treatment of arsenate ores to produce water soluble arsenates by treating the ore with a caustic alkali solution. Calcium arsenate is formed, precipitated, washed and is then ready for use as an insecticide.

U.S. Pat. No. 1,509,688, for instance, is directed toward a process for the treatment of arsenical metallurgical dusts. Dusts and fumes containing arsenic are leached with hot water, followed by extraction of the residue with a hot alkali solution. This solution is then oxidized and the arsenic is precipitated with lime.

U.S. Pat. No. 1,827,821 is directed toward a method for producing metallic lead or lead alloys from flue dust which contains lead oxide and arsenic. The flue dust is reacted with fused caustic soda to produce lead and sodium arsenate.

U.S. Pat. No. 2,951,741 provides a process for separating arsenic and sulfur from complex ores. Concentrates of the ore are treated with aerated basic solutions to form alkali metal arsenates and sulfates which are separated by reacting with lime.

U.S. Pat. No. 4,244,927 provides another process for the recovery of arsenic from materials that contain ferric-arsenic compounds which involves leaching with sodium hydroxide. Following crystallization, sodium arsenate is recovered.

Several processes are known that also provide for the recovery of bismuth from flue dusts. In U.S. Pat. No. 3,966,461, for instance, flue dust residues containing lead and silver oxides are leached with an acidic chloride leach that selectively dissolves the bismuth.

U.S. Pat. No. 4,046,687 is directed toward a process for the adsorptive removal of arsenic, antimony and bismuth from aqueous solution. A porous substrate is treated with a salt of phosphoric acid or a phosphoric acid ester. After the metals have been adsorbed, regeneration is effected with hydrochloric acid.

Finally, U.S. Pat. No. 4,244,734 is directed toward a process for recovering copper, zinc, cadmium, germanium, indium, lead, silver, gold, antimony and bismuth from flue dust containing arsenic. The arsenic is precipitated as an insoluble ferric-arsenic compound while the other metals are recovered, leaving the former in the residue. It is then converted to the soluble sodium arsenate and recovered by recrystallization.

Notwithstanding the processes and methods set forth in the foregoing art, large quantities of flue dust continue to exist and grow. The processes set forth hereinbelow, it will be seen, provide relatively simple and low cost means of treating flue dust to provide usable byproducts and waste that is substantially free of useful elements as well as hazardous elements such as arsenic.

DISCLOSURE OF THE INVENTION

It is therefore an object of the present invention to provide a process for treating flue dust containing lead and arsenic to obtain environmentally harmless waste.

It is another object of the present invention to recover sufficient value from the dust to offset the costs of the process.

It is another object of the present invention to treat the flue dust at ambient pressures, medium temperatures and relatively short residence times.

It is yet another object of the present invention to provide a process capable of extracting bismuth.

It is still another object of the present invention to provide a process wherein lead can be recovered or returned to the smelter.

It is another object of the present invention to provide a process which can treat flue dust containing arsenic in the +3 valence state.

It is still another object of the present invention to provide a process specific to the removal of lead.

It is another object of the present invention to provide a process wherein copper and precious metals can be recovered by recycling to the smelter.

It is another object of the present invention to reduce significantly the weight of solid waste that must be safely disposed according to prevailing environmental regulations.

It is still another object of the present invention to remove large amounts of the contained sulfur values as a sodium sulfate raffinate containing minimal toxic metal contaminants to enable its discharge in accordance with safe environmental practices.

It is yet another object of the present invention to provide a process for the recovery of soluble lead values from lead containing wastes and process streams.

These and other objects together with the advantages of the present invention over the prior art shall become apparent from the specification which follows.

In general, a process for the treatment of flue dust comprises the steps of subjecting a slurry of water and flue dust to a first caustic leach to form a first liquids portion of soluble sulfate and a first solids portion, subjecting the first solids portion to a second caustic leach to solubilize lead and arsenic in a second liquids portion and selectively extracting the arsenic from the second liquids portion by precipitation.

Another process for the treatment of flue dust comprises the steps of separating a slurry of water and flue dust into a first liquids and solids portion, neutralizing the first liquids portion to form a second liquids soluble sulfate and a second solids portion, subjecting the first solids portion to a first caustic leach to produce a third liquids and third solids portion, subjecting the third liquids portion and the second solids portion to a second caustic leach to produce a fourth liquids and fourth solids portion and, selectively extracting arsenic from the fourth liquids portion and bismuth from the third solids portion.

A third process of the present invention provides for the recovery of soluble lead values from lead compounds and comprises the steps of subjecting a slurry of the lead compound to a caustic leach to solubilize the lead and oxidizing the solubilized lead in an electrolytic cell to form lead oxide.

PREFERRED MODE FOR CARRYING OUT THE INVENTION

As noted herein, the present application is directed toward hydrometallurgical processes for environmentally hazardous flue dust produced by copper smelting operations. A first process removes arsenic only and optionally lead. A second process also removes arsenic but also allows for recovery of bismuth which the first process does not. Lead recovery is again optional. Additionally, the processes are capable of removing and recovering molybdenum while almost all of the copper and precious metals are returned to the smelter, optionally with and without lead. The presence of other metals such as iron, silver and gold is unaffected and these are returned to the smelter where they eventually become concentrated and subject to other extractive processes not part of the present invention.

Before proceeding with the details of the processes, focus is directed toward the general composition of flue dust from copper and lead smelting processes. A typical average composition of flue dusts (FD) from two actual sources appears in Table I. Flue dust A (FD-A) is richer in lead than flue dust B (FD-B) which, in turn, has almost twice the arsenic content of FD-A. Although these flue dusts will be discussed throughout the specification, it is to be understood that the present invention is not limited exclusively to the treatment of lead-rich or arsenic-rich flue dusts or that the levels of these elements in FD-A and FD-B define the limits that can be treated.

TABLE I

| Average Composition of Flue Dust Samples | | |
|---|---|---|
| Element | FD-A Wt % | FD-B Wt % |
| Cu | 11 | 14 |
| Fe | 9 | 3 |
| Bi | 2.4 | 1.2 |
| S | 10.2 | 10.0 |
| As | 5.5 | 10.0 |
| Pb | 23 | 15 |
| Mo | 0.25 | 1.5 |
| Sb | 0.28 | 0.25 |
| $SiO_2$ | 3.1 | 2.0 |
| Au (g/metric ton) | 3.75 | 2.81 |
| Ag (g/metric ton) | 271.87 | 171.87 |

The basis for the flue dust treatment processes is leaching with a caustic alkali solution such as sodium hydroxide. This results in the separation of metals into two groups: a water-insoluble or solids group, containing bismuth and several oxides, and a water-soluble or liquid group containing soluble oxyanions including arsenic. Additionally, a large fraction of sulfur is removed as sodium sulfate. The separation is depicted schematically in FIG. 1.

Figure 1:
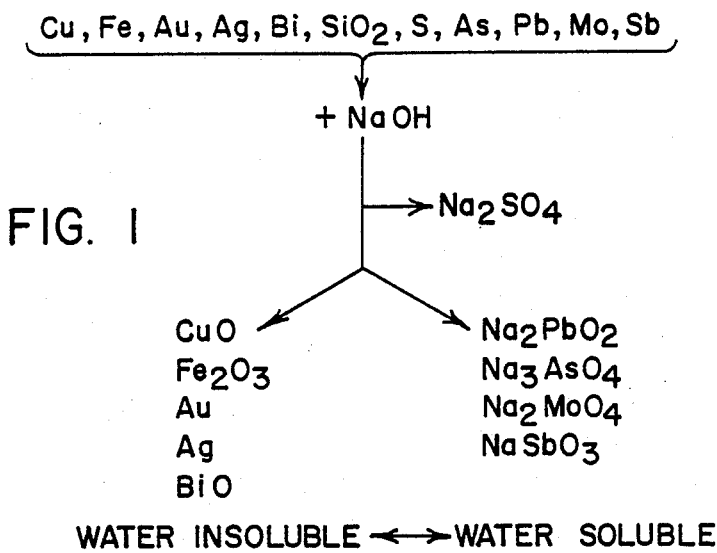
FIG. 1 is a diagrammatic representation of the elements typically present in flue dust from copper and lead smelter operations and the separation thereof following an early stage of the processes of the present invention.

As is seen in FIG. 1, a selective caustic leaching of flue dust yields a solid residue containing most of the valuable metals, i.e., copper, gold and silver, which is suitable for recycle back to the smelter and a caustic solution containing soluble sodium salts of the oxyanion-forming elements.

Figure 2:
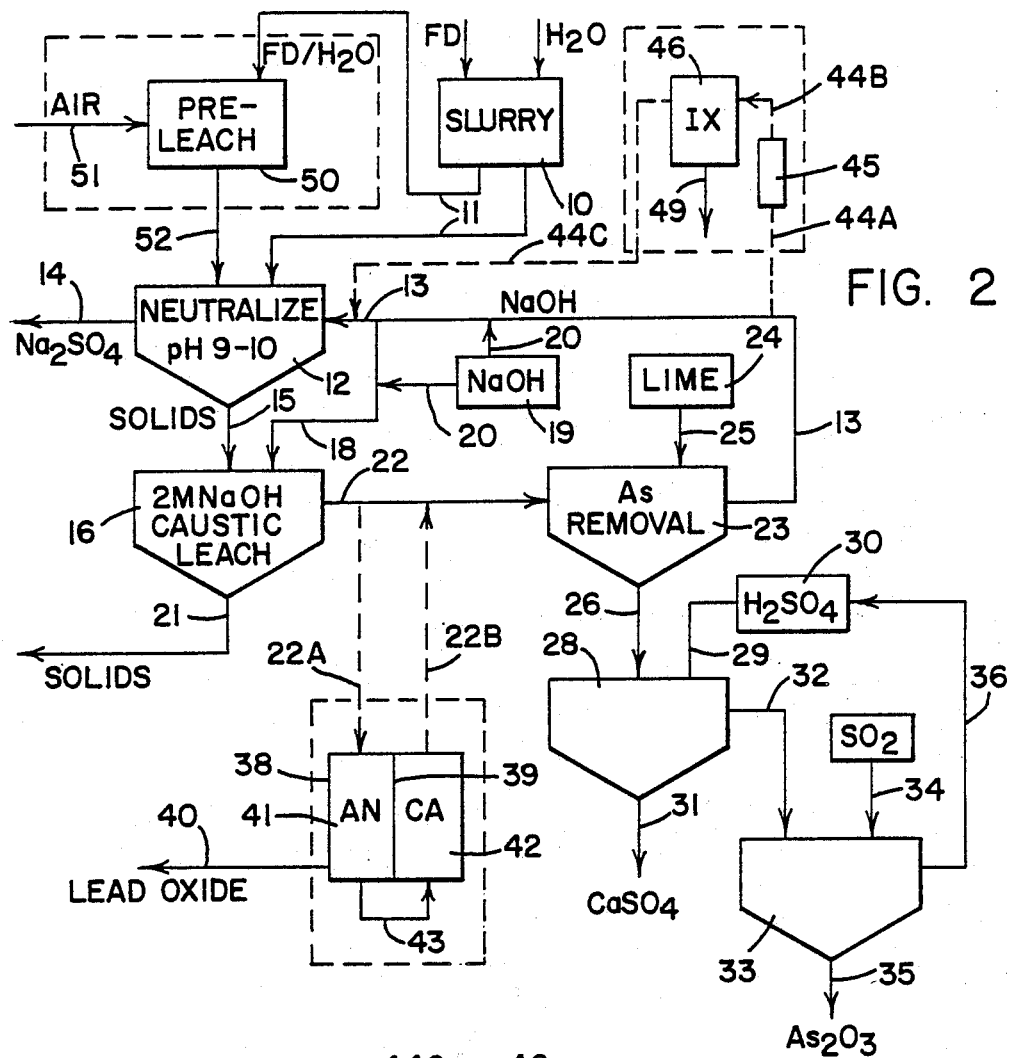
FIG. 2 is a schematic view illustrating a first process of the present invention.

With reference again to the drawings, one of the two leaching processes is depicted schematically in FIG. 2. The flue dust (FD) is fed as a slurry of dust and water through a series of conventional mixing tanks and liquid solid separators (S/L). It is to be understood that the processes can be conducted as a batch or continuously in co-current or counter-current tanks or as otherwise known, and that the selection of any particular reactor system does not constitute a limitation of the present invention.

The selective leaching is performed in two stages. A slurry of flue dust and water, containing from about 10 to 50 percent by weight of dust, is fed from a mixing tank 10, or optionally to a pre-leaching tank to be described later, via stream 11 to a neutralization leach 12, which is employed to leach out selectively only the sulfur, as sodium sulfate. Inasmuch as flue dust consists mostly of metal sulfates and oxides, an initial separation of sulfate can be accomplished by leaching the dust with sodium hydroxide at a pH of 9–10, at ambient temperature. This will cause most of the metal sulfates to hydrolyze and form insoluble metal hydroxides and soluble sodium sulfate as well as metal arsenates and metal molybdates. Typically, the resulting sulfate effluent contains less than 20 ppm of any heavy metal. Thus, a relatively clean sodium sulfate stream is produced which removes 70 to 80 percent of the sulfur contained in the feed material.

The sodium hydroxide is fed into separator 12 from stream 13 which can be fresh or recycled from a later stage of the process. The first liquid portion, containing soluble sodium sulfate, is removed via stream 14 for disposal or waste water treatment, depending upon the content of arsenic. If desired, the arsenic content contained in stream 14 can be removed by a separate scrubbing step discussed hereinbelow.

The first solids are removed via stream 15 to the second stage 16 where selective alkaline leaching is employed. Selective alkaline leaching exploits the differences in the domains of relative stability of various oxyanions in concentrated sodium hydroxide solutions. Most of the elements, whose recycle into the smelter is undesirable, form soluble oxyanions when contacted with concentrated sodium hydroxide. These include lead, zinc, tin, molybdenum, arsenic, antimony and sulfur. Elements such as copper, iron and bismuth exist as insoluble oxides or hydroxides under these conditions. Gold and silver will not be oxidized and will stay, for example, in their reduced metallic state or in other stable compounds. Thus, when the dust is leached with concentrated sodium hydroxide, the elements are separated into two different process streams: the solid residue containing copper, silver, gold, iron and other are recycled to the smelter, while the solution which contains arsenic and lead is further processed.

Concentrated sodium hydroxide, approximately 2 M, is fed via stream 18 to separator 16. Caustic leaching is conducted at a temperature of about 50° to 100° C. for about one hour, depending on the concentration of the sodium hydroxide or, more particularly, the ratio of grams sodium hydroxide per gram of flue dust. We have found that the ratio should not be less than 0.3 g NaOH per gram of flue dust, or good leaching does not occur, and it should not be higher than about 1.4 g NaOH per gram of flue dust or copper will also dissolve. Stream 18 can be taken from recycle stream 13 and supplemented from a make up source 19 via stream 20. Stream 20 can also be combined with stream 13 as necessary for neutralization in separator 12. Solids, in the solid residue stream 21, are returned to the smelter (not shown) and the solution stream 22 is removed for further processing in the third process step.

Removal of arsenic is the main objective of the third step. This is accomplished by precipitation of the arsenic with lime at a temperature of from about 80° to 100° C. for about one hour. Calcium arsenate is formed and sodium hydroxide is regenerated. Over 90 percent of the arsenic can be removed from solution in this step. Once the arsenic has been removed, the sodium hydroxide solution can be recycled to the first and second steps. A readily filterable high grade arsenic (25 to 28 percent) precipitate is obtained, which can be further processed for safe disposal, or to produce an $As_2O_3$ saleable product. Stream 22 is fed to separator 23 to which is added lime from a source 24 via stream 25. The arsenate precipitate is removed via line 26 while sodium hydroxide is recycled via stream 13.

Because not all of the sodium sulfate exits in stream 14, some is fed to separator 16 and in turn, separator 23. Following reaction with the lime in separator 13 to produce calcium arsenate, the recycle stream 13 is actually a mixture of dissolved sodium hydroxide and sodium sulfate. Thus, when it is fed back to separator 12, additional sodium hydroxide from 19 will usually be required to effect the desired neutralization.

Calcium arsenate can be converted to arsenic trioxide by known processes. One suitable process is digestion of calcium arsenate with sulfuric acid, followed by a reduction of the arsenic with sulfur dioxide to precipitate arsenic trioxide. This recovery has been demonstrated by B. R. Krestschmer and A. M. H. Wauchope, "Recovery of Arsenic from Lead Refinery Residues", Aus. I.M.M. Melbourne Branch, Symposium on "Extractive Mettallurgy", Nov. 1984. The process is attractive because both sulfuric acid and sulfur dioxide are readily available from the smelter.

For this conversion and recovery, calcium arsenate from separator 23 is fed via line 26 to a first digestion/separator 28 to which is fed sulfuric acid via stream 29 from the smelter or other suitable supply 30. Calcium sulfate precipitates and is removed at 31 while the liquid portion is fed via stream 32 to a second separator 33 to which sulfur dioxide is fed via stream 34. Arsenic trioxide is precipitated and removed at 35 while the liquid portion, containing predominantly sulfuric acid, exits via stream 36 which is recycled back to source 30.

The basic process also provides an optional step of lead removal which is based on the differential solubility of the oxyanions of lead. When lead is in the Pb(II) form, it is soluble as the $HPbO_2-$ ion in concentrated NaOH, but if it is oxidized to the Pb(IV) form, its solubility is reduced significantly. The lead will then precipitate out as a form of lead oxide. While this oxidation could be readily achieved with hydrogen peroxide or chlorine, neither way is attractive as the former is too expensive due to excessive consumption by catalytic decomposition and the latter generates sodium chloride which would build up during recycle of the alkaline solution, and also would represent sodium value loss.

Instead, according to the present invention, the desired oxidation is carried out electrolytically in an electrolytic cell 38 provided with an anion exchange membrane or diaphragm 39 of the type commercially used in the chloralkali process, where the solution is circulated through the anode compartments. Lead is soluble in the $+2$ state but can precipitate electrolytically to form almost pure lead oxide at the anode while it plates out as lead at the cathode. In fact, about 60 to 80 percent of the lead in solution is precipitated and removed from the bottom of the anode compartment via stream 40. The average grade of this product is about 76 percent lead with less than 3 percent zinc and about 0.1 to 0.5 percent arsenic. By use of the diaphragm 39, the cathode reaction is precluded but if lead recovery in this form is desired, the diaphragm can be eliminated. Arsenic is irreversibly oxidized from $As^{+3}$ to $As^{+5}$ at the anode which is useful for the subsequent precipitation of arsenic. Other metal oxyanions including Zn and Mo species do not precipitate, and thus pass through the cell for further processing or recycle.

Because the remaining lead concentration and presence of zinc will contaminate the arsenic product subsequently recovered, the anolyte can be transferred from the anode compartment 41 to the cathode compartment 42 via line 43 where lead and zinc will form a deposit on the cathode. Lead recovery in the electrolytic cell 38 is preferably conducted at a current density of about 15 mA/cm$^2$ and a cell voltage of 2.5 V.

Stream 22, if fed to the cell 38 via stream 22A, is then removed via stream 22B, for processing of the arsenic. On the other hand, because lead does not hinder the smelting process, it can be recycled rather than removed and thus, lead precipitation i.e., removal, is an optional step. In this instance, stream 22 from separator 16 is directed to arsenic removal 23 with lead in solution as previously described.

The basic process also provides an additional, optional step which is the recovery of the molybdenum. The molybdenum, though small in quantity, has a significant value. Because it is not recovered in any of the other products and is very soluble in concentrated NaOH solutions, it would build up in the recycle stream to an equilibrium value, after which it may start co-precipitating with the arsenic product. To avoid this problem, molybdenum can be recovered from a bleed stream 44A of the recycle stream 13 using ion exchange at 46 and ammonium recovery.

Figure 4:
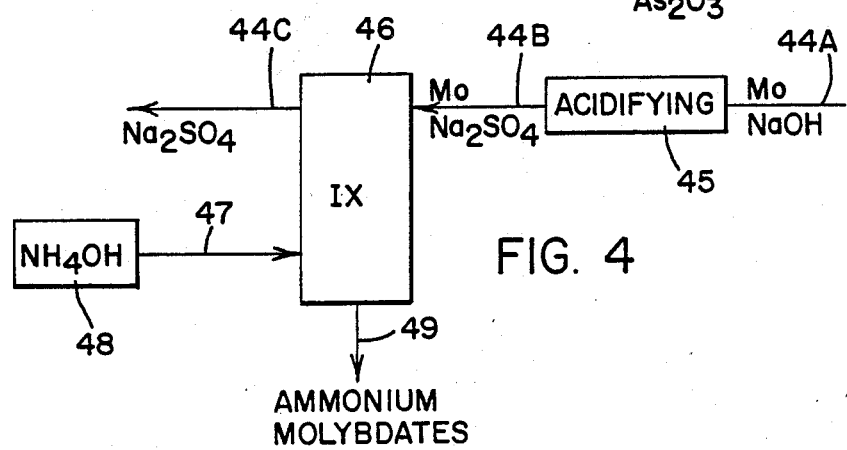
FIG. 4 is a schematic view illustrating a separate process step for the extraction of molybdenum that can be employed with the process described in FIGS. 2 and 3.

With reference to FIG. 4, stream 44A containing dissolved molybdenum, in the solution of sodium hydroxide, is first treated with acid at 45, such as sulfuric acid or other, to lower the alkalinity to a suitable range, e.g., approximately 9-10, after which it is fed to an ion exchange unit 46. After the molybdenum is bound to the ion exchange resin, it can be stripped with ammonium hydroxide via stream 47 from a separate source 48. Ammonium molybdates are formed and removed at 49 while the effluent of sodium sulfate is returned via stream 44C to stream 13. Return is preferably downstream or after stream 18 but may be fed elsewhere including directly into vessel 12.

Thus, the foregoing process provides a relatively good separation of the two types of metals, lead and arsenic. The solid to be sent back to the smelter contains very little of the original arsenic, lead or molybdenum. The two other solids produced, calcium arsenate and lead oxide can be sold or further processed to higher grade materials. The only aqueous effluent is a sodium sulfate stream which contains ppm-level impurities. This stream can be readily handled by existing waste water treatment facilities. The final solid waste for disposal is only a fraction of the original flue dust weight.

The foregoing process is effective where all of the arsenic in the flue dust is in the +5 oxidation state. However, if arsenic in the +3 oxidation state is also present, a low percentage of it is solubilized in the first neutralization leach. Even at amounts of only two percent, a very significant amount of arsenic is present in the resulting sodium sulfate stream and must then be sent to a waste water treatment plant.

Various steps of chemical oxidation were examined for converting all of the arsenic to the +5 state, but each had its drawbacks. It was found, however, that the flue dust could be subjected to an accelerated weathering step by bubbling air through the flue dust/water slurry at 60° C. for two hours. This slurry had a natural pH of about 2.0 and much of the copper and arsenic was in solution. At first, subsequent neutralization with sodium hydroxide provided no decrease in the concentration of arsenic and molybdenum in the sodium sulfate effluent. But when lead and zinc were added to the sodium hydroxide, the concentration of arsenic was lowered from 600 ppm without oxidation to 97 ppm with oxidation. The additional lead and zinc can be provided by the recycle stream 13 exiting the arsenic precipitation step 23, if lead has not already been removed in cell 38. Because arsenic(III) is not easily oxidized with oxygen, it is believed that the success of the "weathering" or oxidation is due to the presence of copper and iron ions in solution.

As noted hereinabove, the selective leaching process can begin with a pre-leach step which converts As(III) to As(V). The flue dust/water slurry, stream 11, can first be fed to the pre-leach vessel 50, as optionally shown in FIG. 2 to which air is fed into the vessel through line 51. Following pre-leaching, the slurry is fed via stream 52 to the separator 12.

Figure 3:
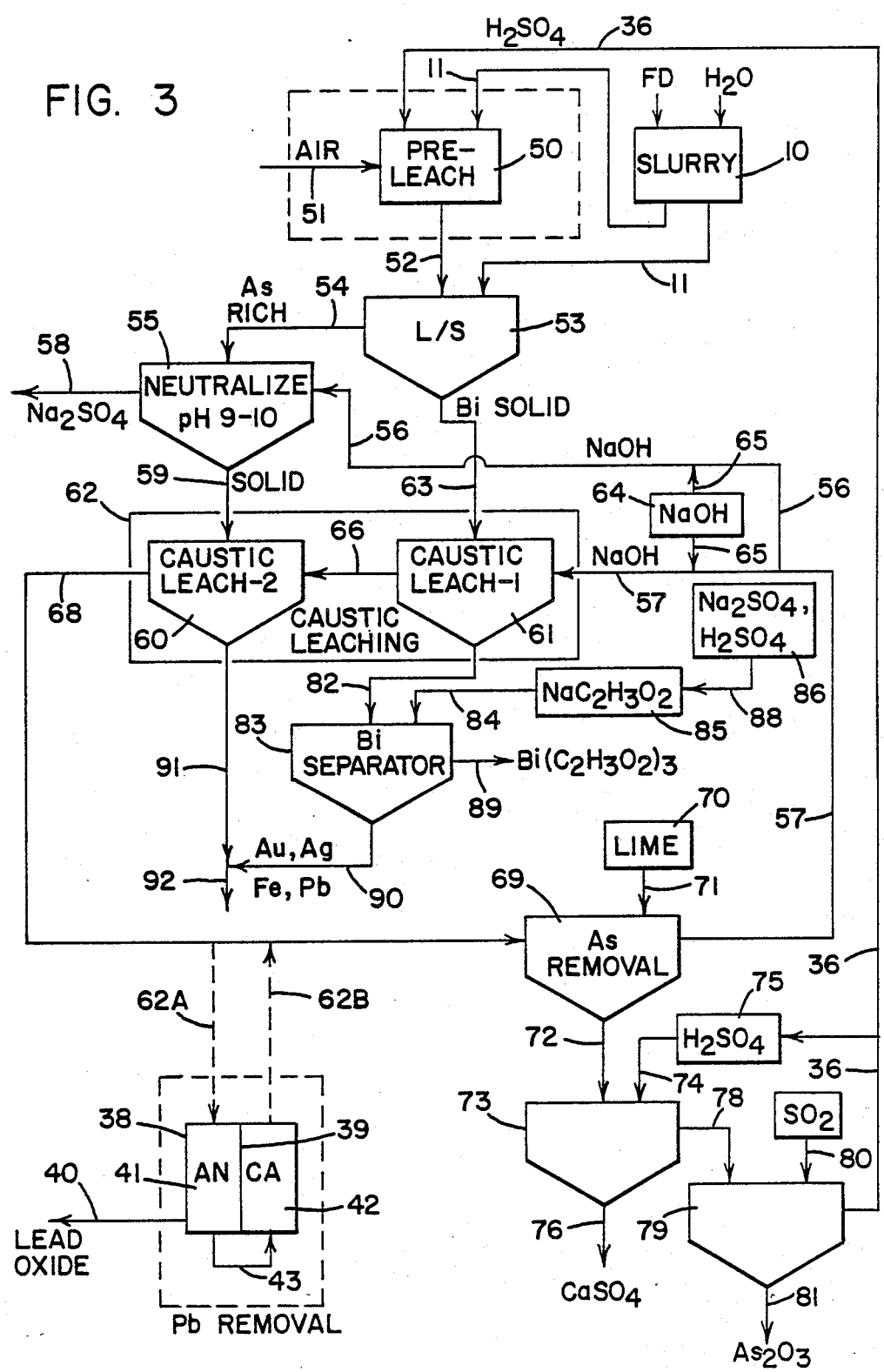
FIG. 3 is a schematic view illustrating a second process of the present invention.

With reference to FIG. 3, a separate selective leaching process has been provided which is employed where bismuth extraction is desired, for example, when the recycle of bismuth with the copper values to the smelter is undesirable. Molybdenum recovery can be performed at a separate stage and again preleaching and lead removal stages are optional.

The process thus begins with the optional pre-leaching of flue dust in vessel 50 as previously described or, where it is known that the arsenic is in the +5 state, by preparing a flue dust/water slurry in mixing tank 10. The pH for pre-leaching step 50 must be acidic, on the order of pH 1-3. The slurry therefrom or pre-leach vessel 50, containing about 10 to 50 percent by weight of dust, is fed via stream 52 to a liquid/solid separator 53.

Where bismuth recovery is desired, the pH for pre-leaching must be acidic, on the order of pH 1-3. To reduce the pH sulfuric acid is fed through stream 36 (from the steps of arsenic oxide recovery) to acidify the slurry which increases the copper and arsenic solubilization. The natural pH of the flue dust is about 2 at which approximately 52 percent of the copper and 61 percent of the arsenic is dissolved. It is necessary to solubilize as much copper as possible for recycling to the smelter. Separate evaluations determined that a level of up to 0.02 g acid/g dust is the preferred amount of sulfuric acid (98 percent) to be added, as greater amounts do not increase copper extraction, and, of course, all of the acid must be neutralized subsequently which increases sodium hydroxide consumption.

In this process, only the liquid portion is neutralized, not the entire slurry. The arsenic-rich solution is fed via stream 54 to the neutralization leach stage in separator 55. A recycled 2 molar solution of sodium hydroxide from subsequent arsenic removal is provided to separator 55 via stream 56 from stream 57. It will be recalled that the stream 57, produced in the first stage of arsenic recovery, contains sodium hydroxide and sodium sulfate. While most of this stream is fed to the caustic leach steps hereinbelow, a portion is returned to separator 55 via stream 56. Here, the solution is neutralized to a pH of 9 to 10, as in the separator 12 of the first process and all of the heavy metals in solution are precipitated except molybdenum and only a small amount of arsenic. The sodium sulfate effluent is removed via stream 58.

It was found that after the number of recycles increased, the concentration of molybdenum was increased and because there was no other outlet provided in the process, it was forced out in stream 58. Although a bleed stream can be taken from sodium hydroxide stream 56 as discussed in conjunction with FIGS. 2 and 4, recovery is possible from stream 58, as the only contamination is a minor amount of arsenic. The former recovery from stream 56 is not depicted in FIG. 3, as it was adequately described hereinabove. Separate steps for the recovery of arsenic and the recovery of molybdenum from stream 58 are discussed hereinbelow. The solid that formed during neutralization was somewhat gelatinous and was found to have a fairly uniform composition in several recycles.

The precipitate from this separator is essentially free of bismuth and is fed via line 59 to one of two caustic leach vessels, vessel 60. Caustic leach vessels 60 and 61 are part of the caustic leaching stage, depicted as 62 in FIG. 3. The other vessel 61 is fed the bismuth rich solid from separator 53 via line 63.

The first caustic leach of the bismuth rich solid is conducted in vessel 61 with a solution containing 2 molar sodium hydroxide which is fed from the sodium hydroxide recycle stream 57, supplemented with a fresh supply 64 via stream 65. Supply 64 can also be employed to supplement stream 56. As will be discussed hereinbelow, bismuth extraction is ultimately conducted with acetate. However, it is necessary that as much of the arsenic be removed as possible or the bismuth extraction will be decreased. The arsenic to bismuth mole ratio of the remaining solids from separator 61 was measured separately and found to be in the range of 0.61 to 1.2 which is favorable for bismuth extraction in the acetate leach. The arsenic to bismuth mole ratio must be below 1.5 in order to extract bismuth efficiently in the acetate leach. Thus, the caustic leach dissolves remaining amounts of arsenic and the liquid stream 66 from separator 61 is fed to the other or second caustic leach vessel 60.

The second caustic leach is conducted in separator 60 with the pregnant solution from separator 61 and the solids from neutralization separator 55. An analysis for the distribution of metals between solution and solids in separator 60 revealed high dissolution of molybdenum and arsenic with lower dissolution of lead and zinc. Although some lead was found in solution, lead was eventually precipitated because as the arsenic dissolved it consumed sodium hydroxide with an attendant lowering of lead solubility.

Generally, the second caustic leach is conducted for a shorter period and at a lower temperature than the first caustic leach. Temperature ranges for the second leach include from about 60° to 90° C., while for the first leach the range is from about 80° to 100° C. Leaching times include about 0.5 to 2 hours for the second leach and about 1.5 to 3 hours for the first leach.

The arsenic rich liquid fraction from separator 60 is fed via stream 68 to a separator 69 for precipitation with lime from a source 70 through stream 71. The step of arsenic precipitation is highly effective as evidenced by the lowering of the arsenic concentration from about 12,000 ppm to about 20 ppm. It also regenerates sodium hydroxide which can be recycled via streams 56 and 57 to separators 55 and 61, respectively. Analyses of the distribution of metals revealed that greater than 99 percent of the arsenic was being removed in every recycle. Approximately 75 percent of the lead and 50 percent of the zinc was also precipitated which is equivalent to only about eight percent of the lead contained in the flue dust.

Calcium arsenate is recovered as a solid via line 72. It can either be disposed of or converted to arsenic trioxide as described hereinabove. To do so, calcium arsenate is fed to a first separator 73 to which is fed sulfuric acid via stream 74 from the smelter or suitable supply 75. Calcium sulfate precipitates and is removed at 76 while the liquid portion is fed via stream 78 to a second separator 79 to which sulfur dioxide is fed via stream 80. Arsenic trioxide is precipitated and removed at 81 while the liquid portion, containing predominantly sulfuric acid, exits via stream 36 which is fed to the pre-leaching separator 50 or recycled back to source 73.

With respect now to the extraction and removal of bismuth, the solids from first caustic leach separator 61 are fed via line 82 to a bismuth separator 83. It was found that the removal of bismuth from any of the process solids could only be done under relatively severe conditions. The primary obstacle to its removal is the arsenic presence because bismuth arsenate is insoluble in most media. Therefore, the two caustic leach stages described hereinabove were employed to produce an intermediate solid that was very low in arsenic. Only two types of complexing agents, sodium acetate and hydrochloric acid, were found which could leach bismuth effectively from this solid, and sodium acetate was selected because of its greater selectivity to bismuth. As will be explained hereinbelow, it is advantageous to extract bismuth with a solution containing sulfate ions, from sodium sulfate or sulfuric acid, and the complexing agent.

The extraction of bismuth with acetate is dependent on the pH as well as the bismuth to arsenic ratio in the solid. If the arsenic concentration is too high, bismuth is not leached from the solid. At first it was found that leaching the residue from the caustic leach in the first process, described in FIG. 2, caused a large amount of copper to be dissolved. The present process (FIG. 3) was then devised to eliminate the majority of the arsenic and copper from the solid that contained the bismuth. To do so, a slurry of the dust was split in separator 53 into a solid 63, and a solution 54, prior to the neutralization step 55.

Most of the arsenic, molybdenum and copper goes into solution while the solids contain most of the lead, iron, bismuth and precious metals. The actual split is dependent on the pH. Leaching these solids with 2 molar sodium hydroxide solution removes as much of the arsenic as possible, making the solid ideal for acetate leaching.

In order to commence bismuth extraction, a solution 84, containing sodium acetate 85 or other complexing agent, and sodium sulfate or sulfuric acid 86, fed from line 88, is fed into bismuth separator 83. Source 86 can be separate and should be where sulfuric acid is selected. Sodium sulfate can be provided from stream 58 or separately. Products separated include a bismuth rich solution containing bismuth acetate 89 and a heavy metals solid containing gold, silver, lead and iron, via line 90. These solids are combined with the solids from separator 60 via line 91, which comprise primarily copper and lead and are recycled to the smelter (not shown) via line 92.

Leaching of bismuth with sodium acetate was conducted experimentally using a 30 weight percent solution to determine the optimum pH range. It was observed that above pH 3.5, significant amounts of lead were dissolved which decreased the selectivity of the leach. Below pH 2.5 there was a decrease in the bismuth extraction. Because both lead and bismuth are complexed with the acetate ion and not acetic acid, lead and bismuth will not be leached when the pH is too low. It was also found that addition of sodium sulfate, or other source of sulfate ions such as sulfuric acid, to the acetate leach solution worked to great advantage because it depressed further the dissolution of lead. Further investigations revealed that the solid product could also be leached by 19 percent hydrochloric acid; however, the extraction of other elements with bismuth was also high. Therefore, sodium acetate solution containing sulfate ions is preferred because of its selectivity to bismuth.

Figure 5:
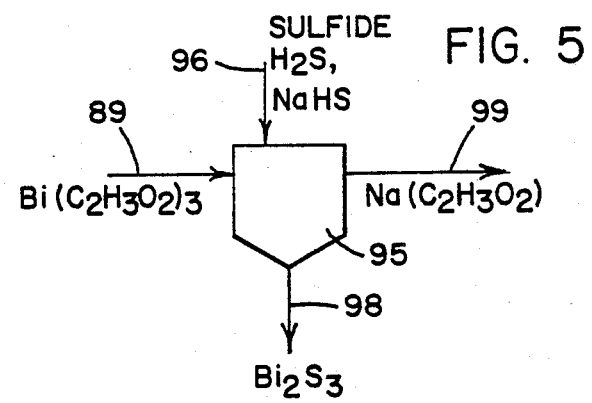
FIG. 5 is a schematic view illustrating a separate process step for the extraction of bismuth that can be employed with the process described in FIG. 3.

It is relatively easy to recover bismuth as well as other metals from the acetate solution by precipitation with sulfide such as from hydrogen sulfide or sodium hydrogen sulfide. With reference to FIG. 5, bismuth acetate line 89 is fed to a separator 95 to which is added a source of sulfide 96 such as hydrogen sulfide, or sodium hydrogen sulfide. A precipitate of bismuth sulfide is formed and removed at 98. If sodium hydrogen sulfide is selected, sodium acetate is regenerated which can be recycled via stream 99 to source 85 for combination with the sulfate ions from 86.

The precipitation was observed experimentally by slowly adding sodium hydrogen sulfide while measuring the relative mV of the solution with a platinum electrode. The sulfide was added until the relative mV was −212 vs. SCE and bismuth and copper were observed to precipitate almost quantitatively.

Another similarity between the first and second processes is that a lead recovery step is only optional. Elimination of the lead recovery step has the possibility of saving a significant amount of money in the initial capital expenditure. Moreover, where the recycle of lead to the smelter is not detrimental to its operation, it may even be beneficial. If lead recovery were to be employed, the sodium hydroxide solution would contain most of the arsenic, molybdenum, zinc and lead and therefore, stream 68 from caustic leach separator 60 would be fed to the electrolytic cell 38 depicted in FIGS. 2 and 3. The operation would be identical to that disclosed in the first process with cell 38 and therefore, it will not be repeated here.

When it follows the caustic leach in either process, the lead recovery step removes most of the lead and some of the zinc. Elimination of this step adds lead contamination to the arsenic precipitate which already contains some lead and zinc. However, as will be discussed next, the lead and zinc presence in sodium hydroxide stream 56 being recycled to separator 55, aids the removal of arsenic from the neutralization leach.

Measuring the percentage of lead in the arsenic precipitate in a process conducted with and without the lead recovery step showed an increase of from 6.4 percent with, to 7.2 percent without, in a single batch test. This increase is relatively low compared to the increase of lead concentration in the caustic solution and eventually a saturation point is reached after which lead is forced into the copper solid and returned to the smelter. A mass balance was conducted on an experimental run without a lead extraction step and it was found that approximately 85 percent of the lead was recycled to the smelter while 15 percent was removed with the calcium arsenate precipitate.

The conditions described previously not only control the type of lead compound formed, but also the purity of the lead oxide, making the processing step flexible enough to be adapted to treatment of other alkaline feed streams. Thus, the electrolytic processing of lead has utility apart from the processes described in FIGS. 2 and 3. Generally speaking, lead can be separated from almost any element which forms soluble oxyanions in sodium hydroxide solutions. Such sources are found in lead containing compounds present, for instance, in steel smelter flue dusts, slags from lead smelting operations, waste from catalysts and other sources and in compounds containing foreign heavy metals.

Figure 6:
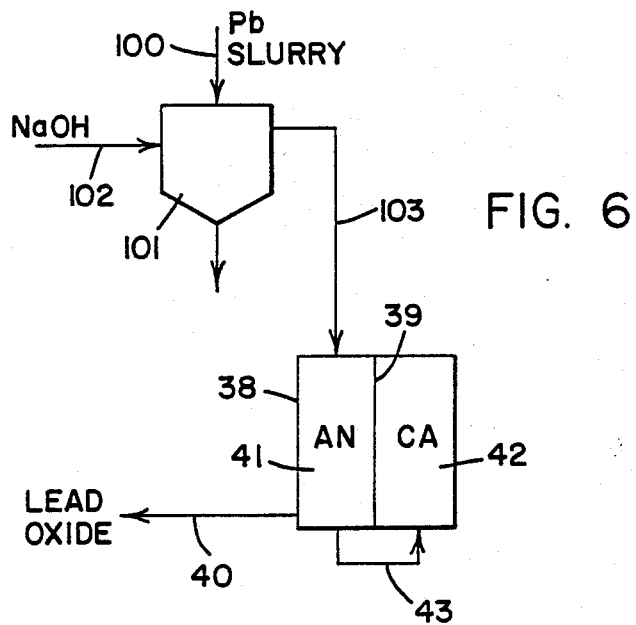
FIG. 6 is a schematic view illustrating a third process of the present invention for the recovery of soluble lead values from lead compounds.

With reference to FIG. 6, a separate process is schematically depicted for the recovery of soluble lead values from any of the foregoing lead compounds. A slurry or solution of the lead compound is fed at 100 to a caustic leach separator 101 to which is fed concentrated sodium hydroxide via stream 102. The sodium hydroxide concentration should not exceed about 2.5 M. The liquids portion is then fed via stream 103 to an electrolytic cell 38 as described hereinabove. Lead oxides are produced in the anode compartment and are removed at 40 or, a lead sponge can be deposited at the cathode.

As noted hereinabove, molybdenum and residual arsenic can each be separately recovered from the sodium sulfate effluent stream 58 from separator 55. Molybdenum recovery from this type of solution is also possible by using ion exchange as is known in the art. Removal of arsenic, after molybdenum recovery, is performed by contacting the sodium sulfate solution with a lead compound. Arsenic scrubbing must follow the molybdenum recovery step. If the order is reversed, then molybdenum will precipitate on the lead scrubbing compound in competition with the arsenic.

Figure 7:
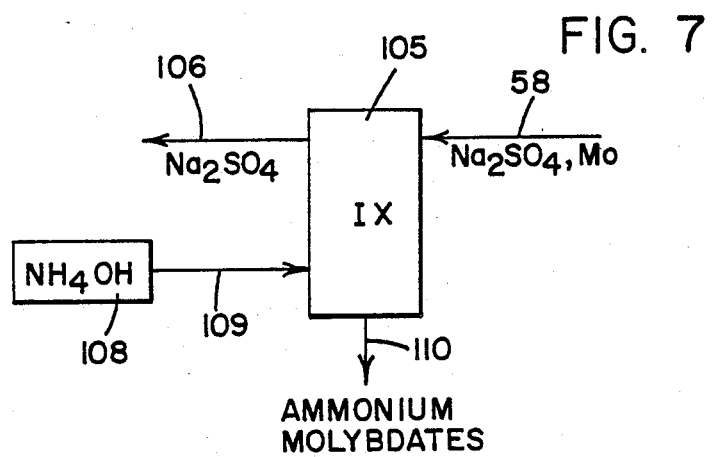
FIG. 7 is a schematic view illustrating a separate process step for the recovery of molybdenum that can be employed with the process described in FIG. 3.

With reference to FIG. 7, the sodium sulfate stream 58 is first fed to an ion exchange unit 105, which collects the molybdenum on the ion exchange resin, as described hereinabove, and produces a sodium sulfate effluent 106 which is essentially devoid of molybdenum, but may contain arsenic. Ammonium hydroxide, from a source 108 is fed via stream 109 to the unit 105 to strip the molybdenum from the resin which is removed as ammonium molybdates at 110.

As noted hereinabove, arsenic may still be present in the sodium sulfate stream if there are not enough heavy metal cations present during neutralization to precipitate it quantitatively. Thus, in order to ensure quantitative removal (less than one ppm), the preferred treatment is to contact the sodium sulfate stream with small amounts of lead compounds. Compounds which successfully remove the arsenic are, lead oxide, lead sulfate, lead oxide pellets, electrolytic lead produced by the lead removal step and Flue Dust A. Some of these compounds are available within the process described at various stages.

Figure 8:
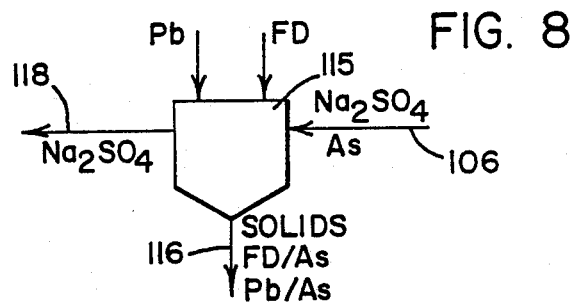
FIG. 8 is a schematic view illustrating a separate process step for stripping arsenic from the sodium sulfate effluent stream described in FIGS. 2 and 3.

With reference to FIG. 8, the sodium sulfate effluent 106 from the unit 105, or a separator such as 55 of FIG. 3, is mixed with 0.5 to 1.0 weight percent of the most economical and available lead compound, which may be provided by flue dust, in a separator 115. The available arsenic quickly bonds to the lead and is removed as solids at 116 which can be recycled back to the slurry 10 or preleach step 50. The lead compound is filtered and the resultant sodium sulfate stream 118 contains less than one ppm of arsenic. The pH of the solution must be maintained between 7 and 10 for this method to be successful. The arsenic saturated lead solid may be recycled to the beginning of the process and added with the flue dust feed. Because this solid represents only a small percentage of the lead and arsenic treated in the process, recycle of the solid to the beginning of the process will have no effect on the process.

Having described the foregoing processes, experimental work that was conducted during the development of this invention is presented next. First a discussion of the general leaching procedure for batch and recycle tests is provided followed by a more detailed discussion of the batch and recycle tests and finally, specific examples have been reported.

PREPARATION OF THE DUST

The two flue dust samples, FD-A and FD-B, were received as a moist agglomerate and therefore, required processing to obtain representative samples. Flue dust A was dried at 60° C. and then the agglomerates were broken up by rolling with a rolling pin. The dust was screened on a 60 mesh screen and the +60 mesh material was crushed with a mortar and pestle until it all passed through the screen. All of the dry dust was thoroughly mixed and each sample used in the experimentation was split from this bulk amount using a rifle splitter.

Flue dust B sample contained large pieces of foreign material such as coal, wood chips and large rocks of unknown origin; however, this is not unusual because the dust was stored in buildings that also stored other materials. After drying, the dust was rolled with the rolling pin to break up the agglomerates and was then screened with a 12 mesh screen. The +12 mesh material was rejected as foreign material and the −12 mesh dust was treated in the same way as dust A. The +12 mesh material represented about 15 percent of the dry weight of the dust. Neither of the dusts were actually homogeneous in the stockpiles. However, these two samples were assumed to be representative of each of the two kinds of dust stockpiled at one location.

Batch Tests

Both the concentrated and the weak neutralization NaOH leaches were conducted in covered beakers with magnetic stir bars. In cases where the temperature was not ambient, the beakers were put in a water bath where the temperature was kept constant. The weakly basic (pH 9.8) neutralization leach was conducted by slowly adding the flue dust to water while adding enough 50 wt % NaOH solution to maintain the pH at 9.8. After all the dust was added, the temperature was adjusted if required by the test and the slurry was stirred for a specified duration.

After leaching, the slurries were filtered and washed. Both the leach solution and wash were then mixed together. Lead and arsenic precipitation were conducted from this solution. Lead oxidation was performed in a 100 ml electrolytic cell of the type depicted in FIGS. 2 and 3. The solution was measured out and placed in the cell. In the cathode compartment, 100 ml of NaOH solution of the same molarity as that of the anolyte was placed. A duPont Nafion 117 ion exchange membrane separated the two compartments. Both the anode and cathode were made of stainless steel sheet. Most of the experiments were run using a current density of about 15 mA/cm$^2$ and ambient temperature. The lead precipitate that formed was separated from the anolyte. Subsequently, the arsenic was precipitated from the spent anolyte by addition of CaO at boiling temperature. A coarse crystalline precipitate formed and was readily filtered.

The elemental composition of both solids and solutions were determined with an ICP spectrophotometer. The solids were first digested with acid before analysis. The elements determined were bismuth, arsenic, copper, iron, molybdenum, lead, zinc and a few less important elements. Sulfur was determined in the solids with a Leco sulfur analyzer. In solutions, sulfur was determined by measuring the sulfate ion concentration using an ion chromatograph.

Recycle Tests

The recycle tests were then conducted to determine the effect of impurities build up in a proposed recycle stream. The conditions of the experiments were selected based on the results of the batch tests. Flue dust A was tested using 100 g per recycle. The scale of these tests was larger to minimize the effect of sample removal for elemental analysis.

The recycle tests were conducted in much the same fashion as the batch tests. The major difference was that after leaching, the wash water was not mixed with the filtrate. In all solution streams the sample size was 20 ml and the analytical solid sample size was 0.25 g. Both the solids and the solutions were analyzed with the same method as in the batch tests.

Characterization of the Dust

The sulfur contents of the dusts were measured with a Leco sulfur analyzer. The oxygen content was also measured. The results of both of these analysis are shown in Table II.

TABLE II

| Oxygen and Sulfur Content of Flue Dusts A and B | | |
|---|---|---|
| Element | FD-A Wt % | FD-B Wt % |
| O | 30.8 | 38.7 |
| S | 7.88 | 11.03 |

Arsenic and molybdenum, although not identified specifically, were believed to occur as arsenates and molybdates based upon their leaching behavior. All of the analyses suggested that both of the dusts occur as base metal sulfates, oxides, arsenates or molybdates.

Batch Tests

Neutralization Leach

The reactions of the flue dust components at pH 9.8 appear to be simple hydrolyses of the sulfate compounds. Examples of these reactions are shown below:

(Eqn. 1) 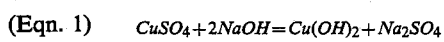
$$CuSO_4 + 2NaOH = Cu(OH)_2 + Na_2SO_4$$

(Eqn. 2) 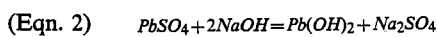
$$PbSO_4 + 2NaOH = Pb(OH)_2 + Na_2SO_4$$

This pH was chosen because lead and zinc are least soluble, and heavy metal arsenic compounds are stable. Three variables were tested in the pH 9.8 leach. These included temperature, time of leach and pulp density. The quantities measured were extraction of sulfur and of heavy metals. Table III shows the extraction of sulfur at various conditions tested for flue dust B. As the pulp density was decreased, the extraction of sulfur was increased. This is probably due to the solubility of sodium sulfate. As the leach time was increased, the extraction of sulfur was increased. In the high temperature experiment, the pH was adjusted at ambient temperature and then the temperature was raised. Temperature had a negligible effect on leaching, under these experimental conditions. All batch tests following these tests were conducted at ambient temperature with a leach time of 20 minutes and a pulp density of 23.1 percent.

TABLE III

| Extraction of Sulfur at Various Conditions for Flue Dust B | | | |
|---|---|---|---|
| Temp. °C. | % Solid in Leach | Time of Leach (Min.) | % S Extraction |
| 25 | 37.5 | 20 | 57.3 |
| 25 | 23.1 | 20 | 69.2 |
| 25 | 13.0 | 20 | 71.5 |
| 25 | 23.1 | 5 | 68.0 |
| 100 | 23.1 | 20 | 65.6 |
| 25 | 23.1 | 16 hr. | 76.6 |

The variance in the extraction of sulfur was relatively high. The average extraction in 11 repeats at the conditions listed above was 69.2 percent with a standard deviation of 5.9. On the other hand, the consumption of NaOH required to neutralize the flue dust was constant for all the conditions and tested at about 0.227 g NaOH per gram of flue dust B. Dust A consumed only 0.0438 g NaOH per gram of dust. The extraction of sulfur was lower also with only 26 percent removed in the leach. It is believed that the lead sulfate is not as easily hydrolyzed as the other base metal sulfates. Much of the remaining sulfate remaining in the dust after this leach was leached in the concentrated NaOH leach which follows.

Heavy metals were not leached in the pH 9.8 leach. The average concentration of metals in the leach solution is shown in Table IV. It is believed that these concentrations will present no problem for treatment of this stream in a wastewater treatment plant.

TABLE IV
Dissolved Metal Content in Solution After pH 9.8 Leach

| Element | Concentration range, ppm |
| --- | --- |
| As | <1-2 |
| Cu | <0.1 |
| Fe | <0.1 |
| Mo | 1-31 |
| Pb | <1-10 |
| Zn | <1-10 |

Selective NaOH Leach

The concentrated NaOH leach process step is where the composition of the "copper product" to be recycled to the smelter is effected and where the removal of the major hazardous metals for recovery or disposal is accomplished. The process step is basically a dissolution/-hydrolysis. Some of the reactions that take place are as follows:

$$Pb(OH)_2 + OH^- = HPbO_2^- + H_2O \quad \text{(Eqn. 3)}$$

$$Zn(OH)_2 + 2OH^- = ZnO_2^{--} + 2H_2O \quad \text{(Eqn. 4)}$$

$$Pb_3(AsO_4)_2 + 9OH^- = 3HPbO_2^- + 2AsO_4^{---} + 3H_2O \quad \text{(Eqn. 5)}$$

$$Cu_3(AsO_4)_2 + 6OH^- = 3Cu(OH)_2 + 2AsO_4^{---} \quad \text{(Eqn. 6)}$$

The equilibrium state of the elements was determined and revealed that lead oxide is solubilized at high hydroxide concentration and is stable as the $HPbO_2^-$ ion and that lead, zinc, arsenic and molybdenum are all soluble at the high concentration of NaOH at which the leachings were done. Copper and iron are stable and insoluble as hydroxides at this pH.

The variables tested in this leach step were NaOH concentration, temperature and pulp density. The effect of temperature was measured and revealed that at 80° C. the extraction was at a maximum for lead and arsenic. Above this temperature there was no advantage gained in extraction. This leach operation was performed at 80° C. for all subsequent experiments.

The three levels of NaOH concentration at which the process was tested were 40, 80 and 120 g/l, which are equivalent to 1, 2 and 3 molar NaOH, respectively. In these tests, the percent solids was varied by changing the amount of NaOH leach solution per constant amount of dust. The results established that the extraction of every element, with the possible exception of iron, was increased as the molarity of the solution was increased or as the percent solids was decreased. This translated into an expected increase in extraction with an increase in the amount of NaOH.

The maximum extraction for As, Mo, Pb and Zn appeared to level out as the amount of NaOH increased. By plotting the extraction of these elements as a function of the amount of NaOH in the leach step, without taking into account the molarity of the solution, the increased extraction with increased quantity of NaOH was studied. The graph thereof showed that about 0.5 grams of NaOH per gram of dust were needed to obtain satisfactory extractions of the elements of interest.

In general, arsenic and molybdenum were almost completely extracted in this leach. This is believed to be because the oxyanions of these elements are soluble down to relatively low pH values. On the other hand lead and zinc are near their solubility limit of their respective oxyanions and, therefore, are more sensitive to changes in NaOH concentrations. Copper and iron do not form soluble oxyanions at this pH.

One fire assay for determination of gold and silver was performed and it was found that basically all of the gold and silver remained in the copper product. These metals are believed to exist in the reduced metallic state in the dust.

Lead Oxidation/Precipitation

Lead is present in the pregnant leach solution in the Pb(II) oxidation state and, as noted hereinabove, Pb(IV) is much less soluble in caustic solution than the lower oxidation state. Consequently, lead values can be removed from the pregnant alkaline solution by oxidation. As noted hereinabove, the preferred manner of effecting this oxidation, when recycle of solutions and regeneration of caustic are required, is by an electrolytic operation.

In actual practice of the anodic oxidation of lead using the cell shown in FIGS. 2 and 3, two types of oxidized lead can form, depending on conditions: (a) an electrolytically formed adherent anodic deposit, and (b) a bulk precipitate. The proposed reactions for the two types of lead oxide formed from the $HPbO_2^-$ anion are shown hereinbelow.

Anodic deposit:
$$HPbO_2^- + OH^- = PbO_2 + H_2O + 2e^- \quad \text{(Eqn. 7)}$$

Bulk precipitate:
$$HPbO_2^- + 3OH^- = PbO_3^{--} + 2H_2O + 2e^- \quad \text{(Eqn. 8) oxidation}$$

$$PbO_3^{--} + 2HPbO_2^- + H_2O = Pb_3O_4 + 4OH^- \quad \text{(Eqn. 9) precipitation}$$

Initially, chemical oxidation of the lead was tried with $H_2O_2$ and NaOCl. The hydrogen peroxide decomposed catalytically in these solutions and consequently, the consumption was high. Sodium hypochlorite oxidized the lead very well but the disadvantage of this reagent was the introduction of chloride anions in the closed loop recycle stream. Both chemical oxidations produced an orange bulk precipitate of lead oxide.

The electrolytically generated bulk precipitate was similar to the bulk precipitate formed with chemical oxidation. Identification of this solid proved to be difficult because it was amorphous and, therefore, could not be identified with X-ray diffraction. The solid assayed about 75-82 percent lead. The literature of lead compounds leads to the conclusion that it was $Pb_3O_4$. The anodic deposit was positively identified as lead dioxide ($PbO_2$).

Cyclic voltammograms established that As(III) also oxidized anodically, to As(V). However, As(V) was not cathodically reduced back to As(III) and, therefore, as noted hereinabove, subsequent removal of arsenic is readily facilitated by precipitation. The same voltammogram indicated that arsenic in the strongly alkaline pregnant solution must already be in the pentavalent state, i.e., it was present as arsenate ion.

The effects of temperature, current density, NaOH concentration, lead concentration, and the degree of agitation on the electrolytic oxidation step were also tested. All tests were conducted at ambient temperature except one which was performed at 80° C. This test removed only 67 percent of the lead from the solution which was less than the 81 percent precipitated at 25° C. Also, at the higher temperature, 36 percent of the lead product was anodically deposited $PbO_2$ while at ambient temperature only 3 percent of the lead product was deposited on the anode, all other variables being constant.

Varying the current density did not have a significant effect on the lead product distribution. At lower current densities, a slight increase in $PbO_2$ formed but the results were not conclusive. However, as is known, current density has a significant effect on current efficiency. Although the current efficiency was not measured, oxygen evolving at the anode suggests that lead oxidation was at, or near its limiting diffusion current.

The effect of anolyte agitation during electrolysis was also tested. Most of the tests were conducted with just enough agitation to circulate the solution gently. When vigorous stirring was applied to the anolyte, about 80 percent of the lead product recovered was anodic lead deposit. Bulk precipitation did not start occurring until almost all of the lead was depleted. All of these results lead to the conclusion that, when the oxidation of lead is diffusion controlled the lead is oxidized according to Equation 8 and precipitates from the bulk solution. The limiting diffusion current is defined by Equation 10.

$$i = -nFD \frac{C}{\eta} \qquad \text{(Eqn. 10)}$$

where:
  i is the limiting diffusion current
  n is the number of electrons transferred in the oxidation
  F is the Faraday constant
  D is the diffusion constant for the lead anion
  C is the bulk concentration of the lead anion
  $\eta$ is the diffusion layer thickness.

As the temperature is increased, the diffusion coefficient, D, increases and this leads to higher limiting current. At low current densities the precipitation is less likely to be controlled by diffusion. As the agitation is increased, the diffusion layer decreases and this results in an increase of the limiting current. Thus, if bulk lead precipitation, i.e., $Pb_2O_3$, is preferred, then the electrolytic cell should be run under conditions where electrolytic oxidation of lead is diffusion controlled.

The NaOH and lead concentrations were varied by taking the leach solutions from concentrated NaOH leach experiments and using them as feed to the cell. The results indicated that: (1) at low NaOH concentrations not much lead was solubilized during leaching and thus not much lead ended up in the lead product; and (2) at high NaOH concentrations lead was not efficiently removed from solution because more of the $PbO_3^{--}$ ion was soluble in the more basic solutions; the reaction in Equation 9 does not occur. Thus, where high lead recoveries are desired, an optimum amount of NaOH addition in the leaching step is two molar NaOH at 10-14 wt % solids.

As discussed hereinbelow, there was some contamination of lead and zinc in the calcium arsenate product precipitated in the step subsequent to electrolysis. This contamination was due to co-precipitation of Pb(IV) and zinc species still remaining in the spent anolyte, after lead removal. Therefore, it was necessary to decrease the amounts of contaminants/diluents in the intermediary arsenic product in order to reduce the burden on the alternative arsenic disposition strategies.

One manner by which to reduce the amount of lead and zinc in the feed solution to the arsenic precipitation step is to feed the spent anolyte first into the cathodic compartment 44 of the cell 40. The spent catholyte, still containing all arsenic in the pentavalent state, became the feed to the arsenic precipitation step. As was mentioned earlier, As(V) is not reduced cathodically, a significant advantage of this step.

Following oxidation, the spent anolyte was filtered to remove the lead precipitate and then placed in the cathode compartment. While lead in fresh anolyte was oxidizing in the anode compartment 43, both lead and zinc were reduced and co-deposited on the cathode as a metal alloy sponge. The lead-zinc alloy was about 60 percent zinc and 40 percent lead with little contamination from other metals. The sponge was very bulky and grew quite rapidly.

Arsenic Precipitation

The reaction for precipitation of arsenic with lime is shown in equation 11.

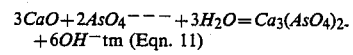
$3CaO + 2AsO_4^{---} + 3H_2O = Ca_3(AsO_4)_2 + 6OH^-$ tm (Eqn. 11)

Calcium hydroxide is relatively insoluble in the highly caustic solutions of these processes. In order for this reaction to take place, enough calcium must go into solution to reach the solubility limit of the calcium arsenate. This can be achieved by performing the precipitation at temperatures close to 100° C., where both the reaction kinetics and solubility of calcium are improved. Another advantage of conducting the precipitation hot is that the calcium arsenate formed is granular and settles well. When the concentration of NaOH in the solution becomes too high, the equilibrium of Equation 11 shifts to the reverse direction and the arsenic is not precipitated out of solution.

These precipitations follow the lead oxidation step, which explains why the lead contamination increased with NaOH addition: the solubility of the $PbO_3^{--}$ ion increases as the caustic concentration increases, and therefore, more lead reaches the arsenic precipitation step.

Calcium plumbate is less soluble than calcium arsenate and, therefore, all plumbate ions present will co-precipitate. Although zinc precipitates out, it is not quantitatively removed. The arsenic is almost completely removed from solutions with caustic additions of less than one gram NaOH per gram flue dust. No molybdenum precipitated with addition of calcium, under these conditions. Neither did sulfate under the strongly alkaline conditions. Sulfate, which enters the loop during the strong alkaline leaching steps 60 and 61 of FIG. 3 and 16 of FIG. 2, exits the loop through streams 58 and 14, respectively, as was discussed hereinabove.

Batch Test Summary

The results of the batch tests established that there was a range of NaOH addition, between 0.5 and 1.0 grams NaOH per gram dust, where the performance of the process was best. Below 0.5 g NaOH/g-dust the extraction of elements was lowered greatly, particularly for lead and zinc. Above 1.0 g NaOH/g-dust, lead was not precipitated when it was oxidized and it did precipitate with the arsenic product. Also, in solutions of excessive alkalinity, arsenic was not precipitated with lime. The recycle tests were conducted within the above optimum alkalinity range, i.e., 0.52 g NaOH per g-dust.

Recycle Tests

In the recycle experiments, every step was dependent on the previous step and also on the number of recycles already completed.

Neutralization Leach

An unexpected result in this step was an increase in the extraction of sulfur with increasing recycles. In the batch tests, the maximum sulfur extraction at the pH 9.8 leach was 77 percent. In all recycles after fourth one the extraction of sulfur was greater than 85 percent.

The solution that was used to neutralize the dust was not pure NaOH as with the batch tests. Rather, it consisted of concentrated NaOH solution from the main recycle stream, regenerated NaOH from the $Na_2SO_4$ recycle stream and some make-up NaOH, necessitated by the inefficiency of the sulfate precipitation operation. This solution contained relatively high amounts of zincate, plumbate, molybdate and arsenate ions. Thus, when contacted with the flue dust the reactions were somewhat different than with NaOH alone. Because lead was the least soluble of the metal sulfates present, the lead sulfate did not appear to be hydrolyzed completely in this leach. But when arsenic was present, the lead salt exchanged the sulfate for the arsenate according to the following reaction.

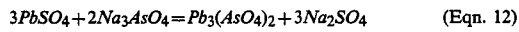

$$3PbSO_4 + 2Na_3AsO_4 = Pb_3(AsO_4)_2 + 3Na_2SO_4 \qquad \text{(Eqn. 12)}$$

This observation is supported by the solubility data for lead arsenate, lead sulfate and lead hydroxide. Under the conditions of the leach, the solubilities of lead for the three compounds were: lead hydroxide, $3.0 \times 10^{-7}$; lead sulfate, $7.6 \times 10^{-8}$; and lead arsenate, $1.8 \times 10^{-11}$ molar. These data tend to explain why the lead sulfate was not hydrolyzed completely with NaOH alone at pH 9.8. Even with recycle of a large amount of heavy metals in solution into the pH 9.8 leach, none of the heavy metals remained in solution after the leach. The lead and zinc are at their pH of minimum solubility while the arsenic and molybdenum probably precipitate out as heavy metal arsenates and molybdenum probably precipitate out as heavy metal arsenates and molybdates by reactions similar to Equation 12. The net result is an uncontaminated sodium sulfate solution for recycle or disposal, a major objective of the processes and of the invention.

Selective NaOH Leach

The sodium hydroxide addition in this step was by dosage. Because the pH at 2 molar NaOH could not be measured and because after one recycle the leach solution would be very buffered with all the oxyanions in it, the NaOH concentration could only be controlled by addition. All tests were conducted by taking the unused portion of the recycle stream and making up the solution to 650 ml with fresh 2 molar NaOH. On the fifth recycle, extra NaOH was added to make up for the circulating load of $Na_2SO_4$ and to make up for build-up of any other sodium compounds in the recycle stream. The amount of NaOH added was 15.7 grams.

Examination of the elements extracted from the flue dust after the concentrated NaOH leach revealed the high extraction of arsenic and molybdenum in all recycles. Although lead and zinc extracted similarly in the batch tests, they did not behave the same in the recycle experiments. Lead was extracted about 50 to 60 percent in all recycles. Zinc was highly variable in its extraction which indicated that zinc was very near its solubility limit. Any small variation in NaOH activity caused a large variance in the solubility of zinc. In actuality, zinc was not effectively removed from solution in any of the precipitation steps. This inefficiency causes a high recycle of zinc which can then build up to its solubility limit in the recycle stream. Although lead was also near its solubility limit, it was removed from solution in every recycle, which resulted in the lowering of its concentration in the recycle stream and consequently, was extracted better than zinc.

The major outlet for zinc was the leach residue, referred to as the copper product, resulting from the strongly alkaline leaching. The composition of the copper product revealed that the zinc content of the copper product for the recycle experiments averaged about twice as high as that for the batch test. It is believed that relatively high amounts of lead and zinc in the copper product recycled to the smelter would not be objectionable.

Lead Oxidation/Precipitation

After the caustic leach the solution was oxidized using the same cell as with the batch tests. Because the amount of solution was greater in the recycle experiments, the cell was run by flowing the solution through the anode compartment at 2.5 cm$^3$ per minute. The composition of the lead product formed was very consistent in the 8 recycles.

Arsenic Precipitation

The arsenic precipitate had a relatively constant composition; the calcium to arsenic ratio appeared to be constant; and the major variation was in the amount of lead and zinc. The arsenic concentration was found to increase with the recycle number which suggested that there was not enough lime added to precipitate all of the arsenic or possibly that the arsenic was not completely oxidized to arsenate.

Recycle Stream and Molybdenum Recovery

The only major element whose concentration was built up in the recycle solution was molybdenum. Molybdenum is a major metal value in the flue dust and it has no outlet from the solution. Tests were therefore conducted to evaluate several Mo recovery schemes.

The first test was a leach of the flue dust with 2 molar NaOH solution spiked with 30 g/l Mo as sodium molybdate. This was done to see if there was a detrimental effect on leaching by allowing the molybdenum to build up to this level in the recycle solution. The high Mo concentration had no measurable effect on the performance of the caustic leach or any other step in the process as is seen in Table V.

TABLE V

| Extraction of Elements in Concentrated NaOH Leach with 30 g/l Mo Added to the Leach Solution | | |
|---|---|---|
| Element | Extraction with 30 g/l Mo, % | Extraction with only NaOH |
| Bi | 0.00 | 0.00 |

TABLE V-continued

Extraction of Elements in Concentrated NaOH Leach with 30 g/l Mo Added to the Leach Solution

| Element | Extraction with 30 g/l Mo, % | Extraction with only NaOH |
|---|---|---|
| As | 89.96 | 88.21 |
| Cu | 0.50 | 0.85 |
| Fe | 0.32 | 0.00 |
| Mo | 74.8 | 92.79 |
| Pb | 59.14 | 62.80 |
| Zn | 67.38 | 67.28 |

One Mo recovery scheme included neutralizing the bleed stream with sulfuric acid and extracting molybdenum with a strong anion exchange resin. The qualitative results of this test were: (1) most of the lead and zinc and some of the arsenic precipitated during neutralization. This solid could be recycled to the beginning of the process; (2) good selectivity of the molybdenum extraction over the As by the ion exchange was demonstrated. The solution after Mo removal could be sent to the pH 9.8 leach to strip out the arsenic from solution. (3) molybdenum is readily eluted from the ion exchange resin with 3 molar NaOH. Although NaOH was used in the actual experiment, the preferred stripping reagent would be $NH_4OH$ which could make recovery of ammonium para- or di- molybdate possible. Stripping with $NH_3OH$ was not tested.

In the examples which follow, the effect of the various steps of the processes in extracting and concentrating elements has been reported. An explanation of the procedure is presented first, followed by a table in which the actual results appear.

EXAMPLE NO. 1

Neutralization Leach

In one example of the neutralization leach of the flue dust, 30.0 grams of FD-B was slowly mixed with 100 ml of water while enough 50 wt % sodium hydroxide solution was added to keep the pH at about 9.8. The total weight of sodium hydroxide solution added was 12.95 grams. The resulting slurry was stirred for 20 minutes at ambient temperature. The slurry was filtered and the solids were washed with distilled water. The filtrate and wash water were mixed. Elemental analysis of the solution and the solid was performed and the elemental distribution is shown on Table VI.

TABLE VI

Extraction of Elements in Neutralization Leach of FD-B and Composition of Solid

| Element | Extraction of Elements (%) | Composition of Solid (Wt %) |
|---|---|---|
| Bi | 0.0 | 1.04 |
| As | 0.0 | 9.20 |
| Cu | 0.0 | 19.20 |
| Fe | 0.0 | 4.40 |
| Mo | 0.03 | 1.00 |
| Pb | 0.0 | 14.80 |
| Zn | 0.0 | 6.00 |
| S | 65.7 | 5.10 |

EXAMPLE NO. 2

Caustic Leach

Batch caustic leaches using the solid material from the neutralization leaches reported in Table VI were conducted in the following manner. The solid material was mixed with varying volumes of 2 molar NaOH solution and leached for 20 minutes at 80° C. The slurry was filtered and the solids were washed with distilled water. Both leach residue and leach liquor were analyzed for important elements. Table VII presents the extraction of elements on the g NaOH/g flue dust basis.

TABLE VII

Extraction of Elements from Neutralized Solid with 2 Molar Sodium Hydroxide Solution at the Listed Grams NaOH/Grams Dust Ratios

| Element | 0.267 g NaOH per g dust (%) | 0.667 g NaOH per g dust (%) | 1.07 g NaOH per g dust (%) |
|---|---|---|---|
| Bi | 0.00 | 0.00 | 0.00 |
| As | 65.04 | 89.91 | 95.70 |
| Cu | 0.03 | 1.33 | 2.56 |
| Fe | 0.00 | 0.07 | 0.08 |
| Mo | 77.28 | 91.58 | 96.72 |
| Pb | 18.83 | 67.25 | 76.70 |
| Zn | 3.03 | 70.10 | 79.56 |

EXAMPLE NO. 3

Lead Oxidation/Precipitation

The most favorable place to perform the lead oxidation/precipitation step is between the caustic leach and arsenic precipitation. The lead removal step can be performed using different configurations of the electrolytic lead cell. For only lead removal from the recycle lead solution the following configuration and procedure were used. A caustic leach solution (100 ml) containing the concentration of elements listed in Table VIII was placed in the anode compartment of the electrolytic cell shown in FIGS. 2 or 3. In the cathode compartment of the cell was a solution of 2 molar sodium hydroxide. A potential of about 2.4 volts was applied to the cell. The electrode area was 32.5 cm$^2$ and the current density was 15.4 mA/cm$^2$. This current density was maintained for 45 minutes. The anolyte was allowed to sit for one hour because lead oxide was still slowly precipitating out of solution. Table VIII provides the distribution of elements in the caustic solution and the lead precipitate.

TABLE VIII

Concentration and Distribution of Elements Before and After Electrolytic Oxidation/Precipitation of Lead from the Caustic Leach Solution

| Element | Concentration in Caustic Before Pb Precipitation (ppm) | Distribution in Lead Precipitation (%) | Concentration in Caustic After Pb Precipitation (ppm) |
|---|---|---|---|
| As | 10000 | 0.36 | 10000 |
| Cu | 72 | 77.8 | 17 |
| Mo | 2000 | 0.07 | 2000 |
| Pb | 9300 | 57.3 | 3800 |
| Zn | 2600 | 5.1 | 2500 |

EXAMPLE NO. 4

Arsenic Precipitation

In the testing of the arsenic precipitation step in recycle tests where no lead removal was performed, the following typical results were obtained. A mixture of 650 ml of the pregnant caustic solution from the second caustic leach, which is represented by stream 68 of FIG. 3, and 15.0 grams of calcium oxide powder was prepared. The resulting slurry was mixed for 30 minutes at 100° C. to form a coarse crystalline calcium arsenate solid. After mixing, the slurry was filtered and both the solid calcium arsenate and the resulting caustic solution were analyzed for the elements of interest. The distribution of elements in this typical recycle test is presented in Table IX.

TABLE IX

Concentration and Distribution of Elements Before and After Arsenic Precipitation from the Caustic Leach Solution

| Element | Concentration in Caustic Before As Precipitation (ppm) | Distribution in Arsenic Precipitation (%) | Concentration in Caustic After As Precipitation (ppm) |
| --- | --- | --- | --- |
| As | 12000 | 99.86 | 19 |
| Cu | 30 | 96.58 | 4 |
| Mo | 2400 | 1.71 | 2600 |
| Pb | 2400 | 79.57 | 580 |
| Zn | 1100 | 41.65 | 500 |

EXAMPLE NO. 5

Preleach Separation of Metals

Preleach of the flue dust to oxidize the arsenic and make an initial separation of the metals was conducted in the following manner. One hundred grams of flue dust B was mixed with 250 ml water and 3.0 grams of 98% sulfuric acid. This slurry was stirred for two hours at 60° C. while bubbling air. The slurry was then filtered. The solid was repulped with 50 ml of distilled water and 2.0 grams of sulfuric acid. After repulping the slurry was filtered and both filtrates were combined. Both the solid material and the solution was analyzed for the elements of interest. Table X reports the distribution of elements in the solid and solution.

TABLE X

Concentration and Distribution of Elements After the Preleach of FD-B

| Element | Distribution in Solution (%) | Composition of Solid Material (%) |
| --- | --- | --- |
| Bi | 0.00 | 2.52 |
| As | 68.17 | 7.60 |
| Cu | 78.93 | 4.80 |
| Fe | 16.64 | 4.00 |
| Mo | 60.99 | 1.20 |
| Pb | 0.00 | 21.60 |
| Zn | 92.83 | 0.37 |

EXAMPLE NO. 6

Neutralization of Preleach Solution

The acid copper/arsenic solution, which results from the preleach of the flue dust as explained in Example No. 5, was neutralized to remove the sulfate and to form a solid for subsequent sodium hydroxide leaching. In one of the recycle tests the neutralization was performed by mixing 335 ml of the acidic preleach solution with 346 ml of the 2 molar sodium hydroxide recycle solution. The resulting pH of the slurry was 9.8. The slurry was stirred for 30 minutes before filtering. The precipitate that formed was highly hydrated. Analysis was performed on the solution and solid for the elements of interest. The distribution and concentration of elements in the solutions and solids of this subprocess are presented in Table XI.

TABLE XI

Concentration of Elements in the Acidic Preleach Feed Solution, the Two Molar Caustic Recycle Solution, and the Resulting Sodium Sulfate Solution

| Element | Concentration in Acid Solution (ppm) | Concentration in Caustic Recycle Solution (ppm) | Concentration in Neutral Sulfate Solution (ppm) |
| --- | --- | --- | --- |
| Bi | 0 | 0 | 0 |
| As | 18900 | 42 | 280 |
| Cu | 21000 | 4 | 0 |
| Fe | 832 | 0 | 0 |
| Mo | 2100 | 1600 | 1000 |
| Pb | 0 | 1500 | 0 |
| Zn | 5790 | 1000 | 0 |

EXAMPLE NO. 7

Caustic Leach of Preleach Residue-First Caustic Leach

According to the process presented in FIG. 3, the solid produced after the preleach was subsequently leached in the first caustic leach to remove enough arsenic to make subsequent bismuth leaching possible. As explained hereinabove, the arsenic to bismuth mole ratio must be below 1.5 in order to obtain satisfactory bismuth leaching. This first caustic leach was performed for one recycle test in the following manner with the following results. A 45.71 gram sample of the solid residue from the acidic preleach (see Table X for composition) was mixed with 400 ml of fresh and recycle 2 molar sodium hydroxide. This slurry was mixed for 2 hours at 100° C. The slurry was filtered and washed with 50 ml of 2 molar NaOH and 50 ml water. The combined filtrate and solid were each analyzed for elements of interest. The distribution of elements in the leach solution and the solid residue are given in Table XII. The data show that the arsenic to bismuth mole ratio in the solid residue is about 0.65 which is much below the 1.5 ratio necessary for subsequent bismuth leaching.

TABLE XII

Distribution of Elements in the First Caustic Leach Solution and Composition of Solid Leach Residue of the First Caustic Leach

| Element | Distribution in Solution (%) | Composition of Solid Material (%) |
| --- | --- | --- |
| Bi | 0.0 | 4.8 |
| As | 87.0 | 1.1 |
| Cu | 3.4 | 10.8 |
| Fe | 0.0 | 10.4 |
| Mo | 96.7 | 0.1 |
| Pb | 49.3 | 31.6 |
| Zn | 58.2 | 0.6 |

EXAMPLE NO. 8

Caustic Leach of Neutralization Precipitate-Second Caustic Leach

As described previously the precipitate that formed during neutralization of the acid preleach solution (See Example No. 6) is leached with the caustic solution from the first caustic leach (see Example No. 7). In an example of one recycle test, the wet solid from the neutralization precipitation was mixed with 410 ml of caustic solution from the first caustic leach for 1 hour at 80° C. This slurry was filtered and washed. Both solid and solution were analyzed for specific elements. The distribution of elements into the caustic solution and the composition of the solid leach residue is shown on Table XIII.

TABLE XIII
Distribution of Elements in the Second Caustic Leach Solution and Composition of Solid Leach Residue of the Second Caustic Leach

| Element | Distribution in Solution (%) | Composition of Solid Material (%) |
|---|---|---|
| As | 86.3 | 5.2 |
| Cu | 0.03 | 29.2 |
| Fe | 0.0 | 1.2 |
| Mo | 97.2 | 0.2 |
| Pb | 19.2 | 22.4 |
| Zn | 16.4 | 8.4 |

EXAMPLE NO. 9

Acetate Leaching of Bismuth Solid

The solid residue from the first caustic leach contains all of the bismuth and is in a form that is amenable to acetate leaching. This example describes the conditions of the acetate leach step and results of one acetate leach experiment. About 19.78 grams of residue from the first caustic leach (process step 61) was mixed with 60 ml of distilled water, 20 ml of acetic acid and 6.0 grams of sodium sulfate. The pH of the slurry was adjusted to 4.0 with sulfuric acid. The slurry was then stirred for 1 hour at 60° C. After filtering, the leach solution and solid were analyzed for elements of interest. The distribution of elements in the leach solution and composition of the leach residue are shown in Table XIV.

TABLE XIV
Distribution of Elements in the Acetate Leach Solution and Composition of Solid Leach Residue of the Acetate Leach

| Element | Distribution in Solution (%) | Composition of Solid Material (%) |
|---|---|---|
| Bi | 73.62 | 1.52 |
| As | 38.07 | 0.92 |
| Cu | 35.69 | 7.20 |
| Fe | 43.14 | 6.40 |
| Pb | 1.51 | 22.40 |

EXAMPLE NO. 10

Arsenic Scrubbing

In an example of arsenic scrubbing with lead oxide, 100 ml of a 7.18 gram/liter solution of sodium sulfate with 50 ppm of arsenic was contacted with 1.0 gram of PbO. The pH of the resultant slurry was adjusted to 10.0 with NaOH solution, until the pH was stable for at least three minutes. The concentrations of arsenic and lead in solution after the lead oxide was filtered were measured. The arsenic concentration was below the 0.2 ppm detectability limit and lead was dissolved to 2.1 ppm. Similar results were obtained for other lead containing compounds.

EXAMPLE NO. 11

Bismuth Precipitation

Bismuth precipitation from the pregnant leach solution described in Example No. 9 was performed in the following manner. The bismuth was precipitated by adding 5 weight percent NaHS solution to 92 ml of the pregnant acetate solution until the oxidation-reduction potential of the slurry was −127 mV vs. the standard hydrogen electrode. The black precipitate that formed was filtered and both filtrate and precipitate were analyzed for elements of interest. The composition of the precipitate and the distribution of metals into the precipitate are shown in Table XV. Similar results can be obtained by using $H_2S$ instead of NaHS. In that case, the raffinate following bismuth precipitation step can be recycled to the bismuth leach step without build-up of sodium ions.

TABLE XV
Composition of the Sulfide Precipitate and Distribution of Elements into the Precipitate from the Acetate Solution

| Element | Distribution in Precipitate (%) | Composition of Precipitate (%) |
|---|---|---|
| Bi | 100.0 | 16.8 |
| As | 42.6 | 0.88 |
| Cu | 100.0 | 15.2 |
| Fe | 20.8 | 3.44 |
| Pb | 99.9 | 11.2 |

Based upon the foregoing data, it should be apparent that the processes disclosed herein for caustic leaching are highly effective in treating flue dust from copper and lead smelters and extracting arsenic as well as metals such as lead, molybdenum and bismuth. Not only are these elements extracted in nearly quantitative yields but the processes operate at low temperature and pressures and without incurring the expense of costly reagents or reagents that cannot be regenerated inexpensively. Similarly, the process for the recovery of lead from various waste compounds, solutions and the like via electrolysis has also been demonstrated to be effective.

Thus, it should also be appreciated by those skilled in the art that the processes and those modifications and adjuncts set forth herein are operable on a variety of flue dusts, as well as lead compounds for the separate process of lead recovery, in various combinations, described or otherwise disclosed, and within various processing parameters. Furthermore, it is to be understood that all of the variables, those disclosed as well as those falling within the existing skill in the art, are encompassed within the scope of the claimed invention and that the subject invention is in no way limited by the examples and respective tables set forth herein. These have been provided merely to provide a demonstration of operability and, therefore, the selection of flue dusts, lead compounds, reactants, processing steps and parameters and the like can readily be determined without departing from the spirit of the invention herein disclosed and described. Moreover, the scope of the invention shall include all modifications and variations that fall within the scope of the attached claims.

We claim:

1. A process for the treatment of acid flue dust containing copper, lead, arsenic, sulfur and molybdenum comprising the steps of:
   raising the pH of an acidic slurry of water and flue dust to about 9–10 with an alkali hydroxide to form a first liquids soluble sulfate solution and a first solids portion containing copper, lead and arsenic;
   separating said first liquids portion from said first solids;
   subjecting said first solids portion to a caustic leach strong enough to solubilize lead and arsenic but not copper in a second liquids portion; and
   precipitating said arsenic from said second liquids portion by reaction with lime.

2. A process, as set forth in claim 1, wherein said step of raising the pH and said caustic leach are conducted with sodium hydroxide.

3. A process, as set forth in claim 2, wherein said first liquids portion is predominantly sodium sulfate.

4. A process, as set forth in claim 2, wherein said caustic leach is conducted with a solution containing 2 molar sodium hydroxide.

5. A process, as set forth in claim 4, wherein said caustic leach is conducted at a temperature of from about 50° to 100° C. for about one hour.

6. A process, as set forth in claim 2, wherein said step of precipitating with lime produces calcium arsenate and regenerates a stream of sodium hydroxide.

7. A process, as set forth in claim 6, including the further step of reacting said calcium arsenate with sulfuric acid to form calcium sulfate and an acidic solution containing As(V) from which arsenic trioxide can be precipitated.

8. A process, as set forth in claim 6, including the additional step of recycling said sodium hydroxide stream produced by said step of precipitating arsenic.

9. A process, as set forth in claim 8, including the additional step of recovering molybdenum from said recycled sodium hydroxide stream.

10. A process, as set forth in claim 9, wherein said step of recovering comprises:
  suitably adjusting the alkalinity of said sodium hydroxide stream to a pH of less than 11 for collection of said molybdenum;
  passing said sodium hydroxide stream through an ion exchange resin to collect said molybdenum; and subsequently
  reacting said molybdenum with ammonium hydroxide to form ammonium molybdates.

11. A process, as set forth in claim 1, including the further step of removing lead solubilized in said second liquids portion from arsenic solubilized in said second liquids portion between said steps of subjecting said solids portion to a caustic leach and precipitating.

12. A process, as set forth in claim 11, wherein said lead is removed in an electrolytic cell anodically and arsenic is oxidized to the +5 oxidation state.

13. A process, as set forth in claim 11, wherein lead is deposited at the cathode as a sponge.

14. A process, as set forth in claim 1, including the further step of preleaching said acidic slurry of flue dust and water by mixing air with said slurry to convert any arsenic in the +3 oxidation state to arsenic in the +5 oxidation state.

15. A process, as set forth in claim 14, wherein said step of preleaching is conducted by bubbling air through said slurry at about 60° C. for approximately two hours.

16. A process, as set forth in claim 1, wherein said slurry comprises from about 10 to 50 percent by weight flue dust.

17. A process for the treatment of acidic flue dust containing copper, lead, arsenic, sulfur, molybdenum bismuth comprising the steps of:
  preparing an acidic slurry of water and flue dust to solubilize a majority of the lead and arsenic;
  separating said slurry into a first liquids portion containing sulfur, lead and arsenic and a first solids portion containing bismuth; and remaining lead and arsenic
  raising the pH of said first liquids portion to a pH of about 9-10 with an alkali hydroxide compound to form a soluble sulfate solution, as a second liquids portion, and a second solids portion containing lead and arsenic;
  separating said second liquids portion from said second solids;
  subjecting said first solids portion to a first caustic leach strong enough to reduce the remaining arsenic content and produce a third liquids portion containing arsenic and third solids portion containing bismuth;
  separating said third liquids portion from said third solids;
  subjecting said third liquids portion and said second solids portion to a second caustic leach strong enough to solubilize lead and arsenic and produce a fourth liquids and fourth solids portion;
  separating said fourth liquids portion from said fourth solids; and
  precipitating arsenic from said fourth liquids portion by reacting with lime and removing bismuth from said third solids portion.

18. A process, as set forth in claim 17, wherein said step of neutralizing and said steps of subjecting are conducted with sodium hydroxide.

19. A process, as set forth in claim 18, wherein said step of neutralizing is conducted at a pH of about 9 to 10 with a solution containing 2 molar sodium hydroxide.

20. A process, as set forth in claim 18, wherein said first caustic leach is conducted with a solution containing up to about 2.5 molar sodium hydroxide and at a temperature of about 80° to 100° C. for about 0.5 to 2 hours.

21. A process, as set forth in claim 18, wherein said second caustic leach is conducted with a solution containing up to about 2.5 molar sodium hydroxide and at a temperature of about 60° to 90° C. for about 1.5 to 3 hours.

22. A process, as set forth in claim 17, wherein said step of precipitating with lime produces calcium arsenate and regenerates a stream of sodium hydroxide.

23. A process, as set forth in claim 22, including the further step of reacting said calcium arsenate with sulfuric acid to form calcium sulfate and an acidic solution containing As(V) from which arsenic trioxide can be precipitated.

24. A process, as set forth in claim 23, including the additional step of recycling said sodium hydroxide stream produced by said step of precipitating.

25. A process, as set forth in claim 17, including the additional step of recovering molybdenum from said soluble sulfate solution.

26. A process, as set forth in claim 25, wherein said step of recovering comprises:
  passing said sodium sulfate solution through an ion exchange resin to collect said molybdenum; and subsequently
  stripping said molybdenum from said resin with ammonium hydroxide to form ammonium molybdates, leaving a second sulfate solution substantially free of molybdenum.

27. A process, as set forth in claim 26, including the additional step of scrubbing arsenic from said second sulfate solution.

28. A process, as set forth in claim 27, wherein said step of scrubbing comprises:
  contacting said second sulfate solution with lead containing compounds to bond said arsenic; and removing said lead containing compound and bound arsenic, leaving said second sulfate solution essentially free of arsenic.

29. A process, as set forth in claim 17, including the additional step of scrubbing arsenic from said soluble sulfate solution.

30. A process, as set forth in claim 29, wherein said step of scrubbing comprises:
contacting said soluble sulfate solution with lead containing compounds to bond said arsenic; and
removing said lead containing compound and bound arsenic, leaving said sulfate solution essentially free of arsenic.

31. A process, as set forth in claim 17, wherein said step of extracting bismuth includes the steps of:
contacting said third solids portion with a solution containing a source of sulfate ions, to depress the dissolution of lead, and sodium acetate at a pH of between about 2.5 to 3.5 to produce bismuth acetate in solution;
adding a sulfide selected from the group consisting of hydrogen sulfide and sodium hydrogen sulfide to said bismuth acetate solution to form a precipitate of bismuth sulfide.

32. A process, as set forth in claim 31, wherein said source of sulfate ion is selected from the group consisting of sodium sulfate and sulfuric acid.

33. A process, as set forth in claim 17, including the further step of removing said solubilized lead from said fourth liquids portion prior to said step of precipitating arsenic.

34. A process, as set forth in claim 31, wherein said lead is removed in an electrolytic cell anodically as an oxide and arsenic is oxidized to the +5 oxidation state.

35. A process, as set forth in claim 33, wherein lead is deposited at the cathode as a sponge.

36. A process, as set forth in claim 22, including the further step of preleaching said acidic slurry of flue dust and water by mixing air with said slurry to convert any arsenic in the +3 oxidation state to arsenic in the +5 oxidation state.

37. A process, as set forth in claim 36, wherein said step of preleaching is conducted by bubbling air through said slurry at about 60° C. for approximately two hours in the presence of sulfuric acid.

38. A process, as set forth in claim 23, including the additional step of recycling said sulfuric acid from said acidic solution containing As(V) to said step of preleaching.

39. A process, as set forth in claim 17, wherein said slurry comprises from about 10 to 50 percent by weight flue dust.

* * * * *